United States Patent
Lin et al.

(10) Patent No.: US 12,468,650 B2
(45) Date of Patent: Nov. 11, 2025

(54) CONNECTION DEVICE

(71) Applicant: ASRock Industrial Computer Corporation, Taipei (TW)

(72) Inventors: Shih-Ming Lin, Taipei (TW); Wan-Ju Cheng, Taipei (TW)

(73) Assignee: ASRock Industrial Computer Corporation, Taipei (TW)

( * ) Notice: Subject to any disclaimer, the term of this patent is extended or adjusted under 35 U.S.C. 154(b) by 30 days.

(21) Appl. No.: 18/612,907

(22) Filed: Mar. 21, 2024

(65) Prior Publication Data

US 2024/0419622 A1 Dec. 19, 2024

(30) Foreign Application Priority Data

Jun. 19, 2023 (TW) ................................ 112206258

(51) Int. Cl.
*G06F 13/42* (2006.01)

(52) U.S. Cl.
CPC .................................... *G06F 13/42* (2013.01)

(58) Field of Classification Search
CPC ....................................................... G06F 13/42
USPC ........................................................ 710/100
See application file for complete search history.

(56) References Cited

U.S. PATENT DOCUMENTS

| | | | |
|---|---|---|---|
| 2005/0219830 A1 | 10/2005 | Coffey et al. | |
| 2007/0248020 A1* | 10/2007 | Hoque | H04L 43/50 370/249 |
| 2009/0172207 A1* | 7/2009 | Remaker | H04L 12/40045 710/12 |
| 2015/0316600 A1* | 11/2015 | Davis | G01R 31/54 324/543 |
| 2017/0146508 A1* | 5/2017 | Deshpande | G01N 15/1459 |
| 2018/0351228 A1* | 12/2018 | Kim | H01P 5/185 |
| 2018/0351229 A1* | 12/2018 | Kim | H04B 17/102 |
| 2019/0049508 A1* | 2/2019 | Davis | G01R 31/50 |
| 2019/0369150 A1* | 12/2019 | Pfaffeneder | G01R 29/10 |
| 2024/0419622 A1* | 12/2024 | Lin | G06F 13/42 |

OTHER PUBLICATIONS

Pepperl+Fuchs Comtrol, Inc., "DeviceMaster ® Serial Hub 8-Port, Part No. 99465-7", available at: https://express-inc.com/v/vspfiles/pdf/99465-7.pdf.

* cited by examiner

*Primary Examiner* — Christopher B Shin
(74) *Attorney, Agent, or Firm* — J.C. PATENTS

(57) ABSTRACT

A connection device is provided. The connection device includes a first transmission terminal, a second transmission terminal, a third connection terminal, a fourth connection terminal, and a circuit wiring zone. The third connection terminal is electrically connected to one end of a cable, and the fourth connection terminal is electrically connected to the other end of the cable. The first transmission terminal is electrically connected to the second transmission terminal through the circuit wiring zone, the third connection terminal, and the fourth connection terminal.

11 Claims, 5 Drawing Sheets

CONNECTION DEVICE

CROSS-REFERENCE TO RELATED APPLICATION

This application claims the priority benefit of Taiwan application serial no. 112206258, filed on Jun. 19, 2023. The entirety of the above-mentioned patent application is hereby incorporated by reference herein and made a part of this specification.

BACKGROUND

Technology Field

This disclosure relates to a device for wired communication, and in particular to a connection device connected to a cable.

Description of Related Art

As a result of technological advances, wired communications technologies, such as EIA-485 protocol (or RS485 protocol), and EIA-422 protocol (or RS422 protocol) are being developed to allow efficient transmission over long distances in environments with electronic noise. Wired communication technology mainly uses cables to carry signals, so when the aforementioned protocols are under test or in use, the cable wires are to be tested to see if they meet the standards specified in the protocols.

The wired communication protocols are usually tested in an environment of FIG. 1A. FIG. 1A is a schematic diagram of signal transmission and testing between two personal computers using a wired communication protocol. The personal computer PC_1 and the personal computer PC_2 communicate with each other through a cable 105 and comply with the same wired communication protocol. The aforementioned protocol or the corresponding wired communication protocol are used for long-distance transmission. For example, if it is to be used to test signal transmission over a medium-long distance in conformity with the wired communication protocol, the cable 105 would need to be of the same length as the transmission distance in order to perform the test. For example, in order to test signal transmission of 1.2 kilometers in conformity with the wired communication protocol over a cable 105, the cable 105 must be 1.2 kilometers long. In order to test signal transmission in conformity with the protocol, high quality cables are required for testing and subsequent technology development. However, high quality cables are not readily available on the market and are expensive, and therefore the cost of the cables used for testing is increased.

SUMMARY

Embodiments of the disclosure provide a connection device that allows a cable connected to the connection device to be equivalent to two or more times a signal transmission distance, thereby reducing the cost of the cable in the development of wired communication technologies.

The connection device in the embodiment of the disclosure includes a first transmission terminal, a second transmission terminal, a third connection terminal, a fourth connection terminal, and a circuit wiring zone. The third connection terminal is configured to be electrically connected to one end of a cable. The fourth connection terminal is configured to be electrically connected to the other end of the cable. The circuit wiring zone is coupled to the first transmission terminal, the second transmission terminal, the third connection terminal, and the fourth connection terminal. The first transmission terminal is electrically connected to the second transmission terminal through the circuit wiring zone, the third connection terminal, the cable, and the fourth connection terminal.

In one embodiment of the disclosure, the third connection terminal includes a first sub-twisted pair contact point, a second sub-twisted pair contact point, a third sub-twisted pair contact point, and a fourth sub-twisted pair contact point. The fourth connection terminal includes a fifth sub-twisted pair contact, a sixth sub-twisted pair contact, a seventh sub-twisted pair contact, and an eighth sub-twisted pair contact. Two electronic devices communicate with each other through the connection device and the cable in compliance with EIA-485 protocol or EIA-422 protocol.

Based on the above, the embodiments of the disclosure allow a cable to achieve long-distance test by means of doubling or multiplying a signal transmission distance of the cable through a circuit layout of the connection device, thereby reducing the cost of the cable in the development of wired communication technologies.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Wired communication protocols (such as EIA-485/RS485 protocol, EIA-422/RS422 protocol) may be used to transmit data using various types of cables. EIA-485 protocol and EIA-422 protocol described in this embodiment may be used to transmit high voltage differential signals using twisted pairs. Specifically, EIA-485 protocol and EIA-422 protocol are protocol standards issued by the Telecommunications Industry Association (TIA) and the Electronic Industries Alliance (EIA). The electrical characteristics of EIA-485 protocol adopts 2-wire, half-duplex, and balanced-wire multipoint communication standard; the electrical characteristics of EIA-422 protocol adopts 4-wire, half-duplex, and balanced-wire multipoint communication standard. Since EIA-485 protocol and EIA-422 protocol are developed for long distances and efficient transmission in an environment with electronic noise, the quality of the cable and the signal transmission distance play an important role.

This disclosure complies the wired protocols (e.g., EIA-485 and EIA-422 protocols) that utilizes the circuit layout in the connection device to transmit information over 2 or 4 wires, that is, exploiting cables of multiple twisted pair (e.g., 8-wire (i.e., 4-pair) twisted pair) to perform long distance tests and allow the signal transmission distance of the connected cable to be equivalent to the double or multiple cable length, thereby reducing the cost of the cable in the development of wired communication technologies.

Figure 1A:
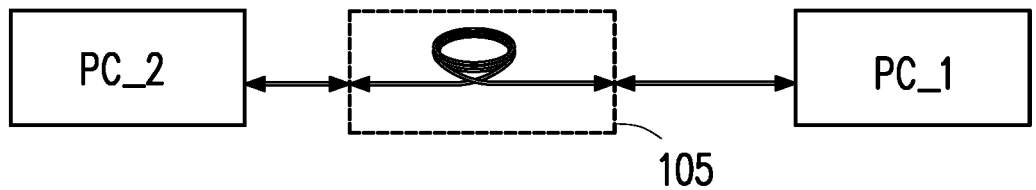
FIG. 1A is a schematic diagram of signal transmission and testing between two personal computers using a cable.
Figure 1B:
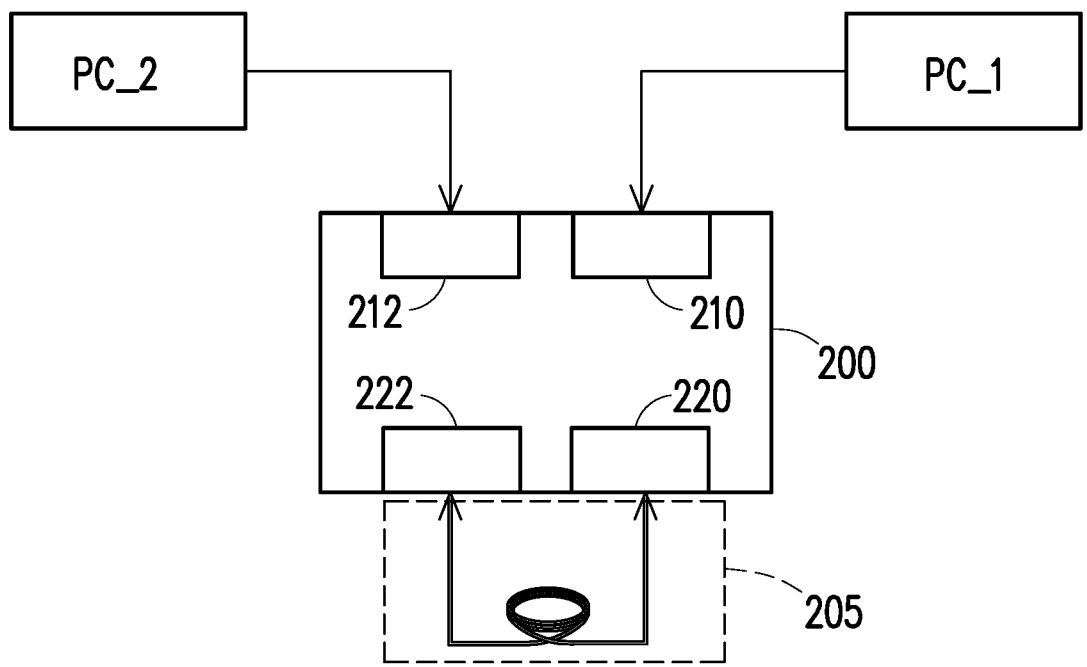
FIG. 1B is a schematic diagram of signal transmission and testing between two personal computers through a cable and a connection device in compliance with a wired communication protocol according to an embodiment of the disclosure.

FIG. 1B is a schematic diagram of signal transmission and testing between two personal computers PC_1 and PC_2 through a wired communication protocol, a cable 205, and a connection device 200 in compliance with a wired communication protocol according to an embodiment of the disclosure. The connection device 200 includes a first transmission terminal 210, a second transmission terminal 212, a third connection terminal 220, a fourth connection terminal 222, and a circuit wiring zone located in the connection device 200. Specifically, the first transmission terminal 210 is electrically coupled to the personal computer PC_1. The second transmission terminal 212 is electrically coupled to the personal computer PC_2.

In this embodiment, the first transmission terminal 210 and the second transmission terminal 212 conform to a format of a DB-9 connector. The third connection terminal 220 and the fourth connection terminal 222 conform to a format of an 8P8C connector. The cable 205 includes 4 pairs of twisted pairs.

The circuit wiring zone is coupled to the first transmission terminal 210, the second transmission terminal 212, the third connection terminal 220, and the fourth connection terminal 222. The first transmission terminal 210 is electrically connected to the second transmission terminal 212 through the circuit wiring zone, the third connection terminal 220, the cable 205, and the fourth connection terminal 222.

In this way, the cable 205 connected to the connection device 200 may double or multiply the signal transmission distance. In this embodiment the cable 205 adopts a cable of a twisted pair for Ethernet. The cable 205 is composed of twisted pairs of 8 wires (i.e., 4 pairs), and uses 8P8C (or RJ45) connectors at both ends of the cable 205. Since EIA-485 protocol requires only 2 wires and EIA-422 protocol requires only 4 wires to realize wired communications, the signal transmission distance of the cable 205 is doubled or multiplied by connecting multiple twisted pairs of the cable 205 with one another through an appropriate circuit layout in the connection device, the twisted pairs of the cable 205 connected in series with one another instead of the 8 wires (i.e., 4 twisted pairs) connected in parallel. Taking transmission over 2 wires in compliance with EIA-485 protocol as an example, the signal transmission distance of the cable 205 may be quadrupled the original length of the cable 205; Taking transmission over 4 wires in compliance with EIA-422 protocol as an example, the signal transmission distance of the cable 205 may be doubled the original length of the cable 205.

Figure 2:
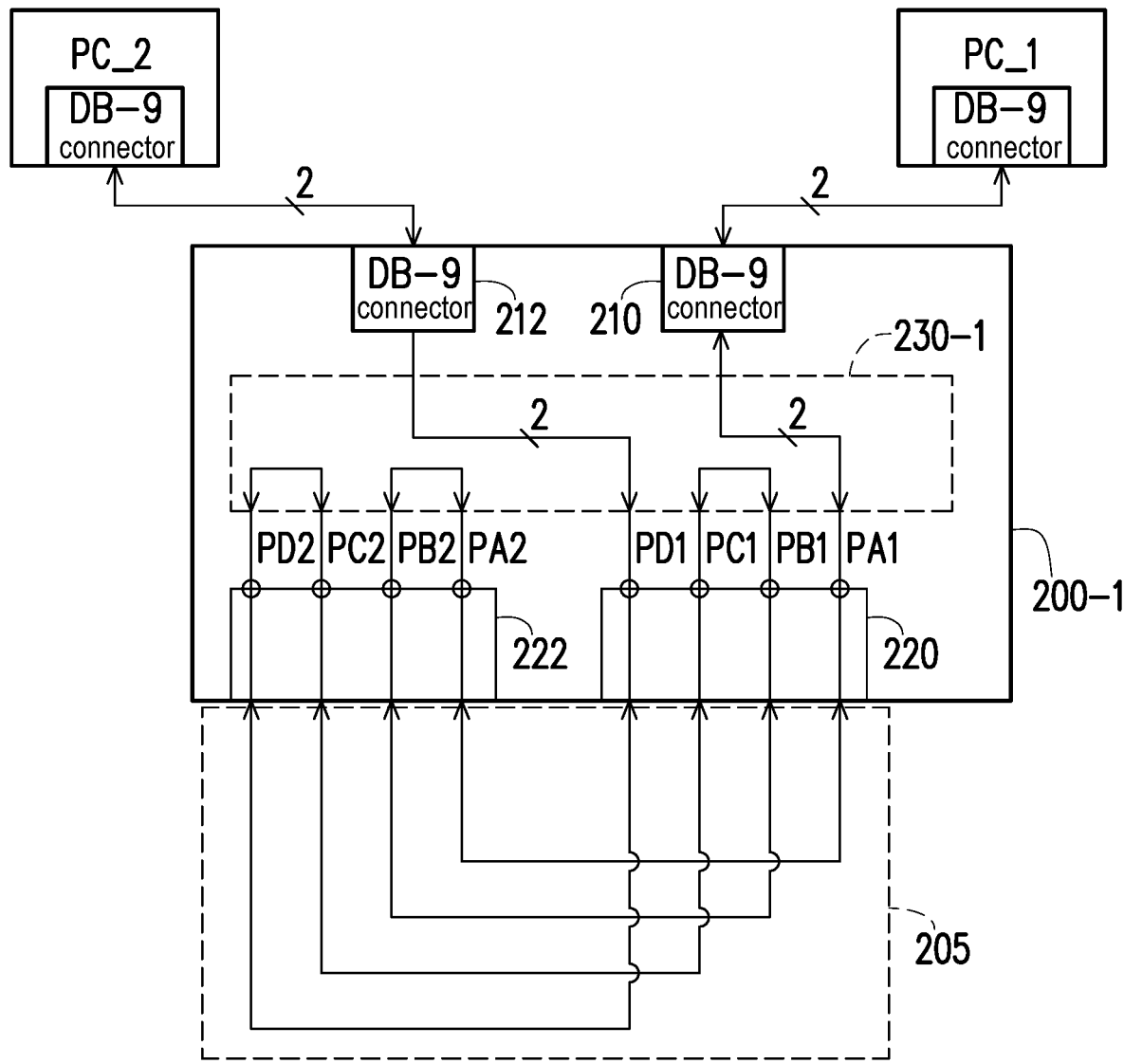
FIG. 2 is a circuit block diagram of a connection device according to a first embodiment of the disclosure.

The layout of the circuit structure and the circuit wiring zone in the connection device 200 in compliance with a different wired communication protocol is elaborated herein to make it more intuitive for those applying the embodiments of the disclosure. FIG. 2 is a circuit block diagram of a connection device 200-1 according to a first embodiment of the disclosure. The wired communication protocol between the personal computers PC_1 and PC_2 in FIG. 2 is EIA-485 protocol. In FIG. 2, the personal computers PC_1 and PC_2 are electrically connected to the connection device 200-1 through DB-9 connectors. The personal computer PC_1 is electrically connected to the first transmission terminal 210 by two contact points in the DB-9 connector, and the personal computer PC_2 is electrically connected to the second transmission terminal 212 by two contact points in the DB-9 connector.

In FIG. 2, the third connection terminal 220 and the fourth connection terminal 222 are electrically connected to two ends of the cable 205 respectively. For illustration purposes, the third connection terminal 220 in FIG. 2 includes a first sub-twisted pair contact point PA1, a second sub-twisted pair contact point PB1, a third sub-twisted pair contact point PC1, and a fourth sub-twisted pair contact point PD1, and the fourth connection terminal 222 includes a fifth sub-twisted pair contact point PA2, a sixth sub-twisted pair contact point PB2, a seventh sub-twisted pair contact point PC2, and an eighth sub-twisted pair contact point PD2.

In FIG. 2, a circuit wiring zone 230-1 electrically connects the first sub-twisted pair contact point PA1 with the first transmission terminal 210, electrically connects the second sub-twisted pair contact point PB1 with the third sub-twisted pair contact point PC1, electrically connects the fourth sub-twisted pair contact point PD1 with the second transmission terminal 212, electrically connects the fifth sub-twisted pair contact point PA2 with the sixth sub-twisted pair contact point PB2, and electrically connects the seventh sub-twisted pair contact point PC2 with the eighth sub-twisted pair contact point PD2. In this way, when the cable 205 is connected to the connection device 200-1, the first transmission terminal 210 is electrically connected to the second transmission terminal 212 through the circuit wiring zone 230-1. A quantity of contacts of each of the sub-twisted pair contact points PA1, PB1, PC1, and PD1 at the third connection terminal 220 and a quantity of contacts of each of the sub-twisted pair contact points PA2, PB2, PC2, and PD2 at the fourth connection terminal 222 are 2.

Figure 3:
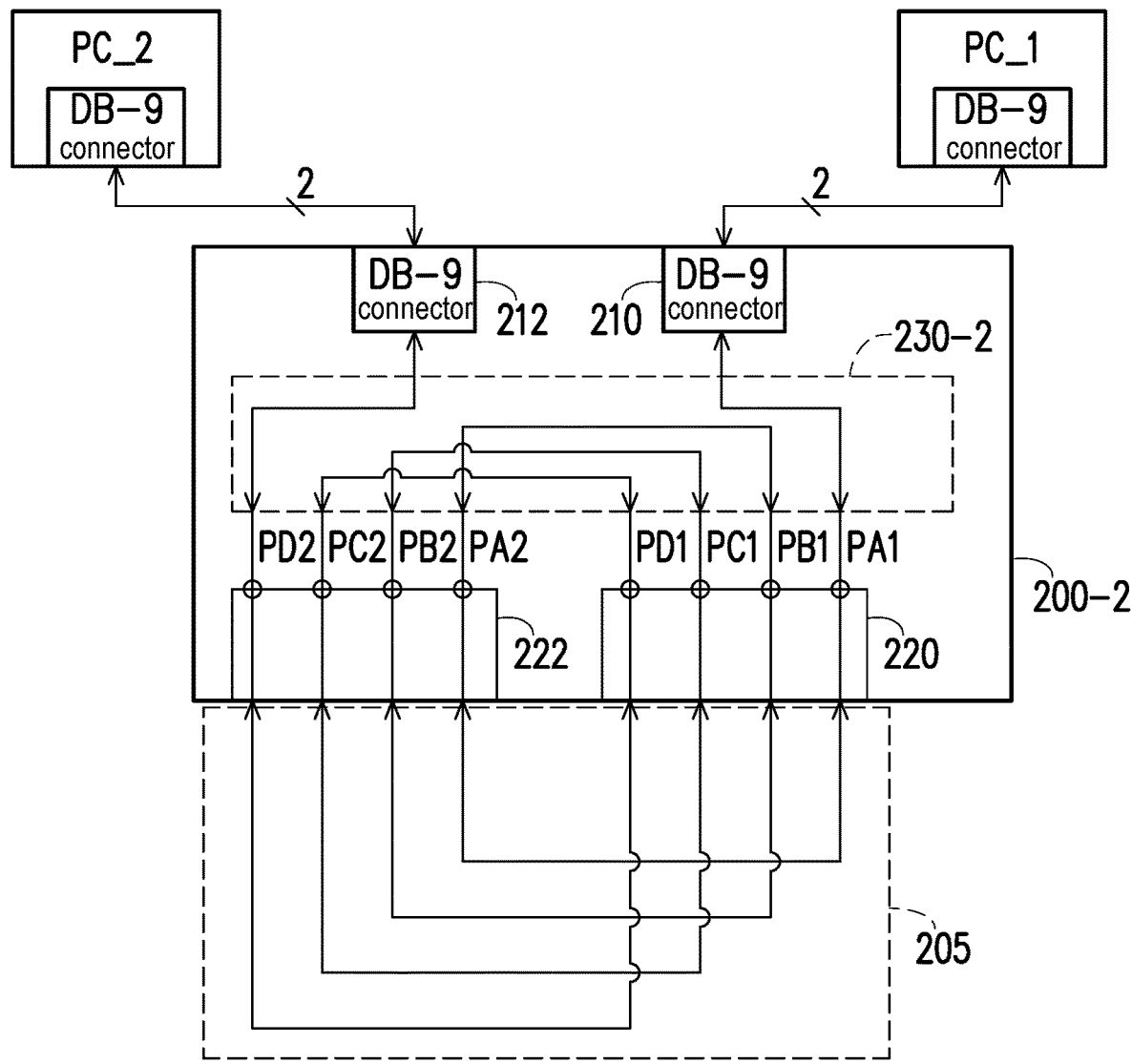
FIG. 3 is a circuit block diagram of a connection device according to a second embodiment of the disclosure.

FIG. 3 is a circuit block diagram of a connection device 200-2 according to a second embodiment of the disclosure. The wired communication protocol between the personal computers PC_1 and PC_2 in FIG. 3 is EIA-485 protocol, and the main difference between FIG. 3 and FIG. 2 is that the circuit wiring zone 230-1 and the circuit wiring zone 230-2 are not the same. Specifically, the circuit wiring zone 230-2 electrically connects the first sub-twisted pair contact point PA1 with the first transmission terminal 210, electrically connects the second sub-twisted pair contact point PB1 with the fifth sub-twisted pair contact point PA2, electrically connects the third sub-twisted pair contact point PC1 with the sixth sub-twisted pair contact point PB2, electrically connects the fourth sub-twisted pair contact point PD1 with the seventh sub-twisted pair contact point PC2, and electrically connects the eighth sub-twisted pair contact point PD2 with the second transmission terminal 212.

Figure 4:
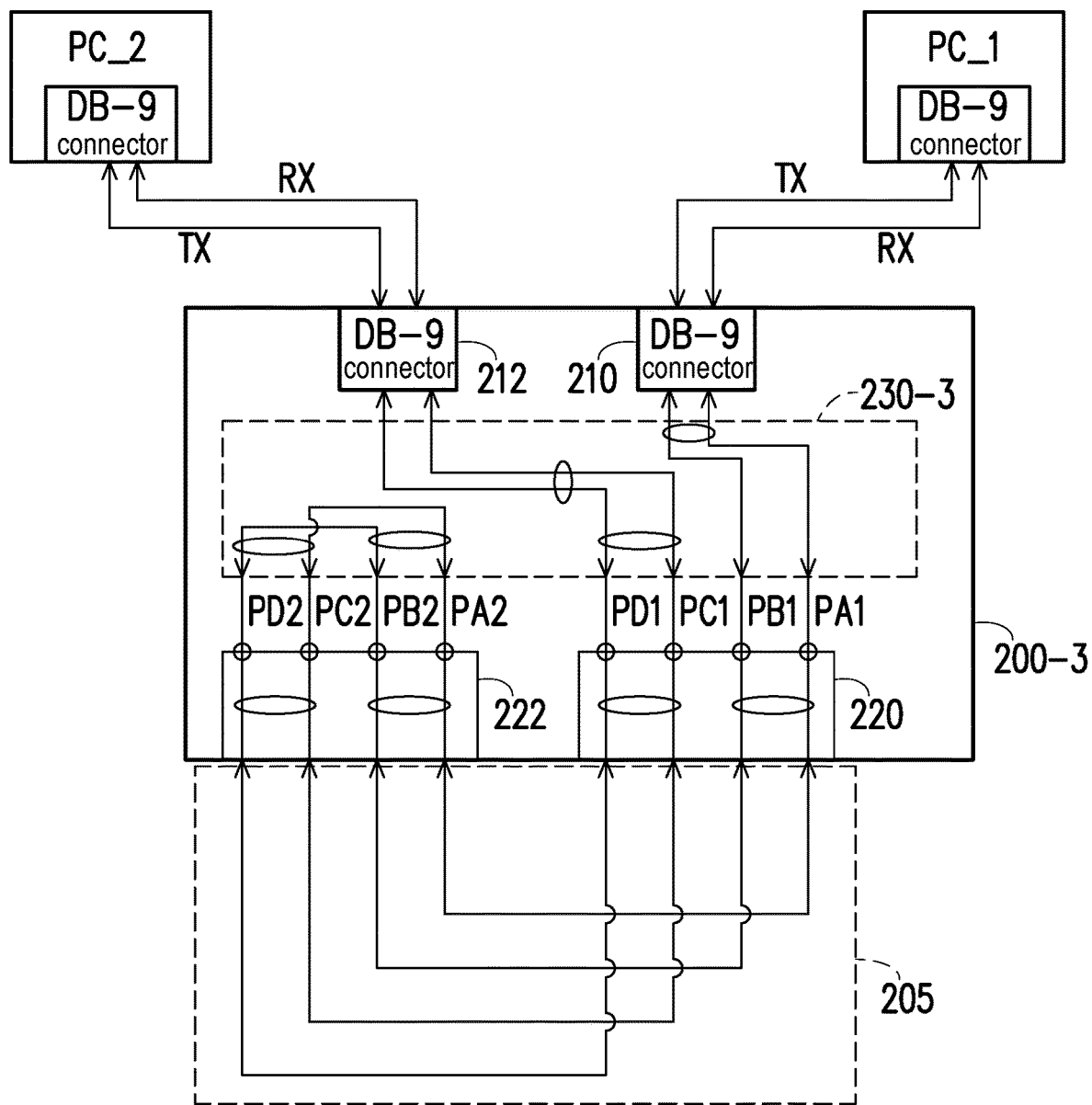
FIG. 4 is a circuit block diagram of a connection device according to a third embodiment of the disclosure.

FIG. 4 is a circuit block diagram of a connection device 200-3 according to a third embodiment of the disclosure. The wired communication protocol between the personal computers PC_1 and PC_2 in FIG. 4 is EIA-422 protocol. In FIG. 4, the personal computers PC_1 and PC_2 are electrically connected to the connection device 200-3 by DB-9 connectors. The DB-9 connector of the personal computer PC_1 is electrically connected to the DB-9 connector of the first transmission terminal 210 using a reception data line RX and a transmission data line TX. The DB-9 connector of the personal computer PC_2 is electrically connected to the DB-9 connector in the second transmission terminal 212 using the reception data line RX and the transmission data line TX. The reception data line RX and the transmission data line TX complies with transmission over 4 wires in EIA-422 protocol.

In FIG. 4, the third connection terminal 220 and the fourth connection terminal 222 are electrically connected to two ends of the cable 205 respectively. For illustration purposes, the third connection terminal 220 in FIG. 4 includes a first sub-twisted pair contact point PA1, a second sub-twisted pair contact point PB1, a third sub-twisted pair contact point PC1, and a fourth sub-twisted pair contact point PD1, and the fourth connection terminal 222 includes a fifth sub-twisted pair contact point PA2, a sixth sub-twisted pair contact point PB2, a seventh sub-twisted pair contact point PC2, and an eighth sub-twisted pair contact point PD2.

In FIG. 4, the circuit wiring zone 230-3 electrically connects the first sub-twisted pair contact point PA1 with the reception data line RX of the first transmission terminal 210, electrically connects the second sub-twisted pair contact point PB1 with the transmission data line TX of the first transmission terminal 210, electrically connects the third sub-twisted pair contact point PC1 with the reception data line RX of the second transmission terminal 212, electrically connects the fourth sub-twisted pair contact point PD1 with the transmission data line TX of the second transmission terminal 212, electrically connects the fifth sub-twisted pair contact point PA2 with the seventh sub-twisted pair contact point PC2, and electrically connects the sixth sub-twisted pair contact point PB2 with the eighth sub-twisted pair contact point PD2.

A quantity of contact points of the first transmission terminal 210 and the second transmission terminal 212 is 4, that is, the total number of contact points of the reception data line RX and the transmission data line TX is 4. The quantity of contact points of each of the sub-twisted pair contact points PA1, PB1, PC1, and PD1 and the quantity of contact points of each of the sub-twisted pair contact points PA2, PB2, PC2, and PD2 are 2.

Figure 5:
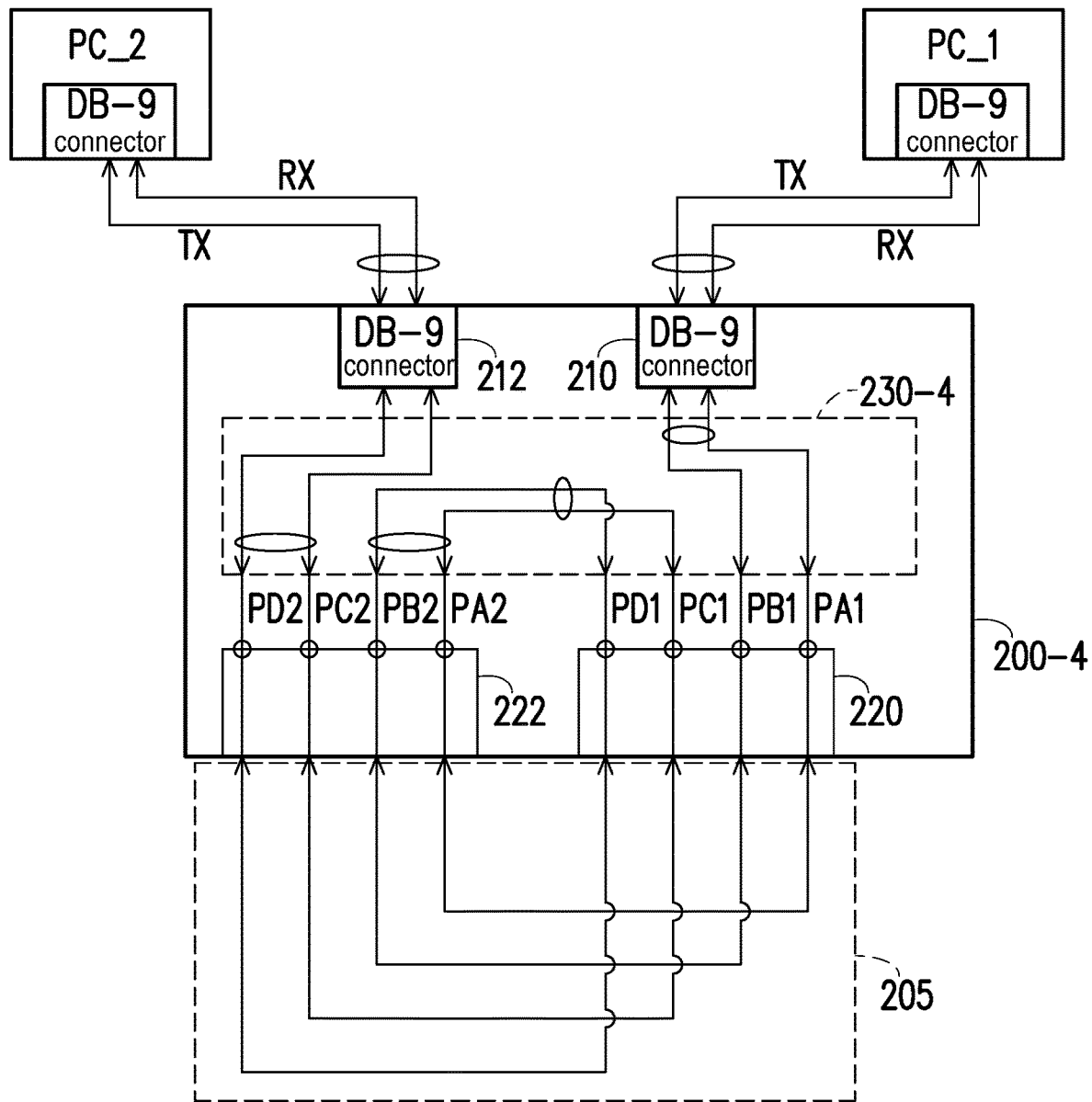
FIG. 5 is a circuit block diagram of a connection device according to a fourth embodiment of the disclosure.

FIG. 5 is a circuit block diagram of a connection device 200-4 according to a fourth embodiment of the disclosure. The wired communication protocol between the personal computers PC_1 and PC_2 in FIG. 5 is EIA-422 protocol, and the main difference between FIG. 5 and FIG. 4 is that the circuit wiring zone 230-3 and the circuit wiring zone 230-4 are not the same. Specifically, the circuit wiring zone 230-4 electrically connects the first sub-twisted pair contact point PA1 with the reception data line RX of the first transmission terminal 210, electrically connects the second sub-twisted pair contact point PB1 with the transmission data line TX of the first transmission terminal 210, electrically connects the third sub-twisted pair contact point PC1 with the fifth sub-twisted pair contact point PA2, electrically connects the fourth sub-twisted pair contact point PD1 with the sixth sub-twisted pair contact point PB2, electrically connects the seventh sub-twisted pair contact point PC2 with the reception data line RX of the second transmission terminal 212, and electrically connects the eighth sub-twisted pair contact point PD2 with the transmission data line TX of the second transmission terminal 212.

To sum up, the embodiments of the disclosure allow a cable to be equivalent to a long-distance by means of doubling or multiplying a signal transmission distance of the cable through a circuit layout of the connection device, thereby reducing the cost of the cable in the development of wired communication technologies.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A connection device, comprising:
   a first transmission terminal;
   a second transmission terminal;
   a third connection terminal, configured to be electrically connected to one end of a cable;
   a fourth connection terminal, configured to be electrically connected to the other end of the cable; and
   a circuit wiring zone, coupled to the first transmission terminal, the second transmission terminal, the third connection terminal, and the fourth connection terminal,
   the first transmission terminal electrically connected to the second transmission terminal through the circuit wiring zone, the third connection terminal, the cable, and the fourth connection terminal,
   wherein the third connection terminal comprises a first sub-twisted pair contact point, a second sub-twisted pair contact point, a third sub-twisted pair contact point, and a fourth sub-twisted pair contact point, and
   the fourth connection terminal comprises a fifth sub-twisted pair contact, a sixth sub-twisted pair contact, a seventh sub-twisted pair contact, and an eighth sub-twisted pair contact.

2. The connection device according to claim 1, wherein the circuit wiring zone electrically connects the first sub-twisted pair contact point with the first transmission terminal, the circuit wiring zone electrically connects the second sub-twisted pair contact point with the third sub-twisted pair contact point, the circuit wiring zone electrically connects the fourth sub-twisted pair contact point with the second transmission terminal, the circuit wiring zone electrically connects the fifth sub-twisted pair contact point with the sixth sub-twisted pair contact point, and the circuit wiring zone electrically connects the seventh sub-twisted pair contact point with the eighth sub-twisted pair contact point.

3. The connection device according to claim 1, wherein the circuit wiring zone electrically connects the first sub-twisted pair contact point and the first transmission terminal, the circuit wiring zone electrically connects the second sub-twisted pair contact point with the fifth sub-twisted pair contact point, the circuit wiring zone electrically connects the third sub-twisted pair contact point with the sixth sub-twisted pair contact point, the circuit wiring zone electrically connects the fourth sub-twisted pair contact point with the seventh sub-twisted pair contact point, and the circuit wiring zone electrically connects the eighth sub-twisted pair contact point with the second transmission terminal.

4. The connection device according to claim 2, wherein a quantity of contacts of each sub-twisted pair contact point is 2, the first transmission terminal is configured to be electrically connected to a first electronic device, and the second transmission terminal is configured to be electrically connected to a second electronic device, and
   the first electronic device and the second electronic device communicate with each other through the connection device and the cable in compliance with EIA-485 protocol.

5. The connection device according to claim 3, wherein a quantity of contacts of each sub-twisted pair contact point is 2, the first transmission terminal is configured to be electrically connected to a first electronic device, and the second transmission terminal is configured to be electrically connected to a second electronic device, and the first electronic device and the second electronic device communicate with each other through the connection device and the cable in compliance with EIA-485 protocol.

6. The connection device according to claim 1, wherein the circuit wiring zone electrically connects the first sub-twisted pair contact point with the first transmission terminal, the circuit wiring zone electrically connects the second sub-twisted pair contact point with the first transmission terminal, the circuit wiring zone electrically connects the third sub-twisted pair contact point with the second transmission terminal, the circuit wiring zone electrically connects the fourth sub-twisted pair contact point with the second transmission terminal, the circuit wiring zone electrically connects the fifth sub-twisted pair contact point with the seventh sub-twisted pair contact point, and the circuit wiring zone electrically connects the sixth sub-twisted pair contact point with the eighth sub-twisted pair contact point.

7. The connection device according to claim 1, wherein the circuit wiring zone electrically connects the first sub-twisted pair contact point with the first transmission terminal, the circuit wiring zone electrically connects the second sub-twisted pair contact point with the first transmission terminal, the circuit wiring zone electrically connects the third sub-twisted pair contact point with the fifth sub-twisted pair contact point, the circuit wiring zone electrically connects the fourth sub-twisted pair contact point with the sixth sub-twisted pair contact point, the circuit wiring zone electrically connects the seventh sub-twisted pair contact point with the second transmission terminal, and the circuit wiring zone electrically connects the eighth sub-twisted pair contact point with the second transmission terminal.

8. The connection device according to claim 6, wherein a quantity of contacts of each sub-twisted pair contact point is 2, the first transmission terminal is configured to be electrically connected to a first electronic device, and the second transmission terminal is configured to be electrically connected to a second electronic device, and the first electronic device and the second electronic device communicate with each other through the connection device and the cable in compliance with EIA-422 protocol.

9. The connection device according to claim 7, wherein a quantity of contacts of each sub-twisted pair contact point is 2, the first transmission terminal is configured to be electrically connected to a first electronic device, and the second transmission terminal is configured to be electrically connected to a second electronic device, and the first electronic device and the second electronic device communicate with each other through the connection device and the cable in compliance with EIA-422 protocol.

10. The connection device according to claim 1, wherein the first transmission terminal and the second transmission terminal conform to a format of a DB-9 connector.

11. The connection device according to claim 1, wherein the third connection terminal and the fourth connection terminal conform to a format of an 8P8C connector, and the cable comprises 4 pairs of twisted pairs.

* * * * *